United States Patent
Nolan

(10) Patent No.: US 7,099,925 B1
(45) Date of Patent: Aug. 29, 2006

(54) ELECTRONIC COMMERCE SESSION MANAGEMENT

(75) Inventor: Sean Nolan, Bellevue, WA (US)

(73) Assignee: Drugstore.com, Bellevue, WA (US)

( * ) Notice: Subject to any disclaimer, the term of this patent is extended or adjusted under 35 U.S.C. 154(b) by 0 days.

(21) Appl. No.: 09/526,978

(22) Filed: Mar. 15, 2000

(51) Int. Cl.
G06F 15/17 (2006.01)

(52) U.S. Cl. .................. 709/217; 709/224; 709/228; 705/5; 705/14; 705/26; 713/201; 713/202

(58) Field of Classification Search ............... 709/203, 709/206, 218, 224, 227, 228, 226, 217, 2; 707/3, 5, 10; 345/760; 705/5, 14, 26; 713/201, 713/202

See application file for complete search history.

(56) References Cited

U.S. PATENT DOCUMENTS

| | | | |
|---|---|---|---|
| 5,761,418 A * | 6/1998 | Francis et al. ............ 709/201 |
| 5,862,223 A * | 1/1999 | Walker et al. ............ 705/50 |
| 5,920,856 A * | 7/1999 | Syeda-Mahmood ......... 707/3 |
| 5,933,822 A * | 8/1999 | Braden-Harder et al. ... 707/5 |
| 5,963,915 A * | 10/1999 | Kirsch ..................... 705/26 |
| 5,983,218 A * | 11/1999 | Syeda-Mahmood ......... 707/3 |
| 6,092,100 A * | 7/2000 | Berstis et al. ............. 709/203 |
| 6,101,512 A * | 8/2000 | DeRose et al. ............. 715/514 |
| 6,167,405 A * | 12/2000 | Rosensteel et al. ......... 707/102 |
| 6,282,543 B1 * | 8/2001 | Kawasaki et al. .......... 707/10 |
| 6,345,256 B1 * | 2/2002 | Milsted et al. ............. 705/1 |
| 6,480,853 B1 * | 11/2002 | Jain ......................... 707/10 |
| 6,486,892 B1 * | 11/2002 | Stern ....................... 345/760 |
| 6,523,023 B1 * | 2/2003 | Sonnenberg ................ 707/3 |
| 6,611,862 B1 * | 8/2003 | Reisman .................... 709/217 |
| 6,629,127 B1 * | 9/2003 | Deen et al. ................ 709/203 |
| 6,691,114 B1 * | 2/2004 | Nakamura .................. 707/10 |
| 6,983,311 B1 * | 1/2006 | Haitsuka et al. ............ 709/217 |

* cited by examiner

*Primary Examiner*—Khanh Dinh
(74) *Attorney, Agent, or Firm*—Blakely, Sokoloff, Taylor & Zafman LLP

(57) ABSTRACT

Methods and apparatuses for electronic session management are disclosed. In one embodiment, a user is connected to a server when initiating a session. Until a predetermined period of time passes without any activity from the user, the user is connected to the same server even if the initial connection with the server is broken. During that time, information related to the user is stored in volatile memory of the server. In one embodiment, a one or more searches are performed and the results of the searches are stored on the servers. When a user performs one of the searches the results are retrieved without repeating the searches. Thus, commonly performed searches can be provided in a more efficient manner as compared to performing the searches multiple times.

18 Claims, 4 Drawing Sheets

ELECTRONIC COMMERCE SESSION MANAGEMENT

FIELD OF THE INVENTION

The invention relates to electronic commerce. More particularly, the invention relates to management of electronic commerce sessions.

BACKGROUND OF THE INVENTION

Typical electronic commerce sessions consist of a user at a client device accessing an electronic commerce World Wide Web site that provides products and/or services. When the user accesses the site, the client device is generally connected to one of a group of servers that provide a copy of the site to the client device. From the user's perspective the server that fact that multiple servers provide copies of the site is transparent.

Because multiple servers can provide copies of the electronic commerce Web site, the multiple servers often provide redundant services. For example, common searches may be performed by each server. For example, during cold season, many users may search an electronic commerce site for cold remedies. Typically, each server that receives such a search request performs the search, which may include relatively slow disk accesses. Multiple servers performing the same search multiple times is inefficient and can result in slower access for users of the electronic commerce site.

Another inefficiency that can result from having multiple servers provide an electronic commerce site is that a user may make multiple accesses within a relatively short period of time. If these user accesses are assigned to servers randomly or on a circular basis, user data may be loaded to a first server for a first access and a second server for a second access. This can also result in slower access for users because the user must wait for data to be retrieved by the second server.

SUMMARY OF THE INVENTION

Methods and apparatuses for electronic commerce session management is described. In one embodiment, data is stored on a server coupled to receive requests from client devices. A set of one or more predetermined search requests corresponding to searches of the data is generated. The set of predetermined search requests is performed. The results of the set of predetermined search requests are stored on the server. Selected search results are provided in response to a corresponding search request being received from one of the client devices. In one embodiment, during a predetermined period of time without inactivity by the user, all requests are directed to the same server.

BRIEF DESCRIPTION OF THE DRAWINGS

The invention is illustrated by way of example, and not by way of limitation in the figures of the accompanying drawings in which like reference numerals refer to similar elements.

DETAILED DESCRIPTION

Figure 1:
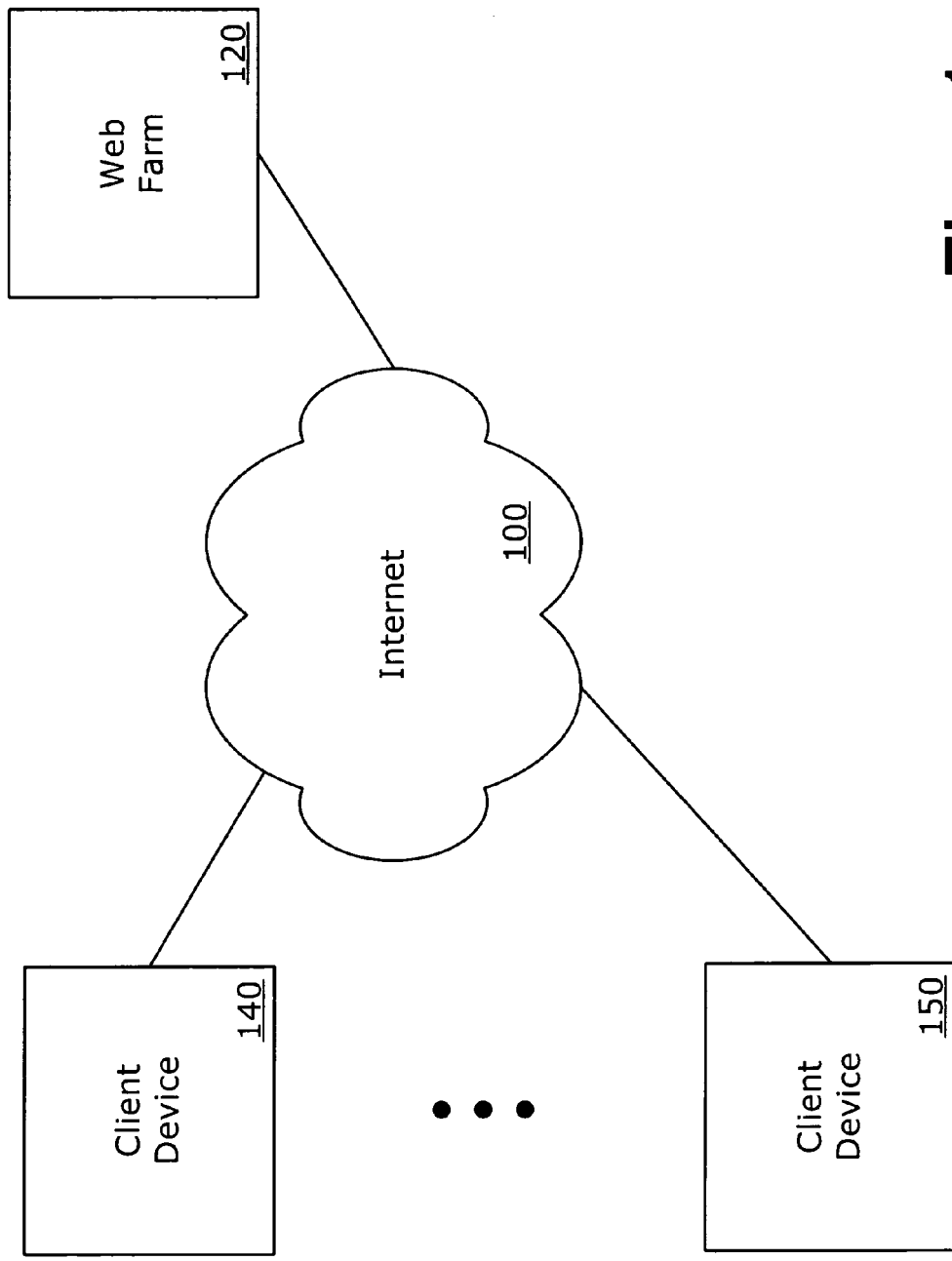
FIG. 1 is one embodiment of a network configuration for providing electronic commerce.

Methods and apparatuses for electronic commerce session management are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Some portions of the detailed descriptions which follow are presented in terms of algorithms and symbolic representations of operations on data within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to apparatuses for performing the operations herein. These apparatuses may be specially constructed for the required purposes, or may comprise a general purpose computer selectively activated or reconfigured by a computer program stored in the computer. Such a computer program may be stored in a machine-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Methods and apparatuses for electronic session management are disclosed. In one embodiment, a user is connected to a server when initiating a session. Until a predetermined period of time passes without any activity from the user, the user is connected to the same server even if the initial connection with the server is broken. During that time, information related to the user is stored in volatile memory of the server. In one embodiment, a one or more searches are performed and the results of the searches are stored on the servers. When a user performs one of the searches the results are retrieved without repeating the searches. Thus, commonly performed searches can be provided in a more efficient manner as compared to performing the searches multiple times.

FIG. 1 is one embodiment of a network configuration for providing electronic commerce. Internet 100 provides a global interconnection of computing devices. The configuration of FIG. 1 illustrates the Internet as an interconnection medium between various parties; however, any network configuration (e.g., local area network, wide area network, metropolitan area network, Internet, intranet), whether wired or wireless, can be used. Also, any appropriate networking protocol can be used.

Client device 140 and client device 150 represent devices used to access networked resources for a user of the respective client devices. Any number of client devices can be coupled to Internet 100. In one embodiment, client devices 140 and 150 are computer systems; however, other devices can also be used. For example, client devices 140 and/or 150 can be "set-top boxes" or "Internet terminals" such as a WebTV™ terminal available from Sony Electronics, Inc. of Park Ridge, N.J., or a set-top box using a cable modem to access a network such as the Internet.

Alternatively, client devices 140 and/or 150 can be "dumb" terminals or thin client devices such as the ThinSTAR™ available from Network Computing Devices, Inc. of Mountain View, Calif. In another alternative embodiment, client devices 140 and/or 150 can be hand held electronic devices, for example, personal digital assistants (PDAs), cellular telephones, pagers, or other electronic systems that provide network access.

Web farm 120 represents any configuration of servers that provide access to electronic resources such as, for example, Web pages, databases. In one embodiment Web farm 120 includes multiple Hypertext Markup Language (HTML) servers that provide electronic commerce Web pages to client devices 140 and/or 150. Any configuration that provides access to electronic resources using any appropriate protocol can be used.

Figure 2:
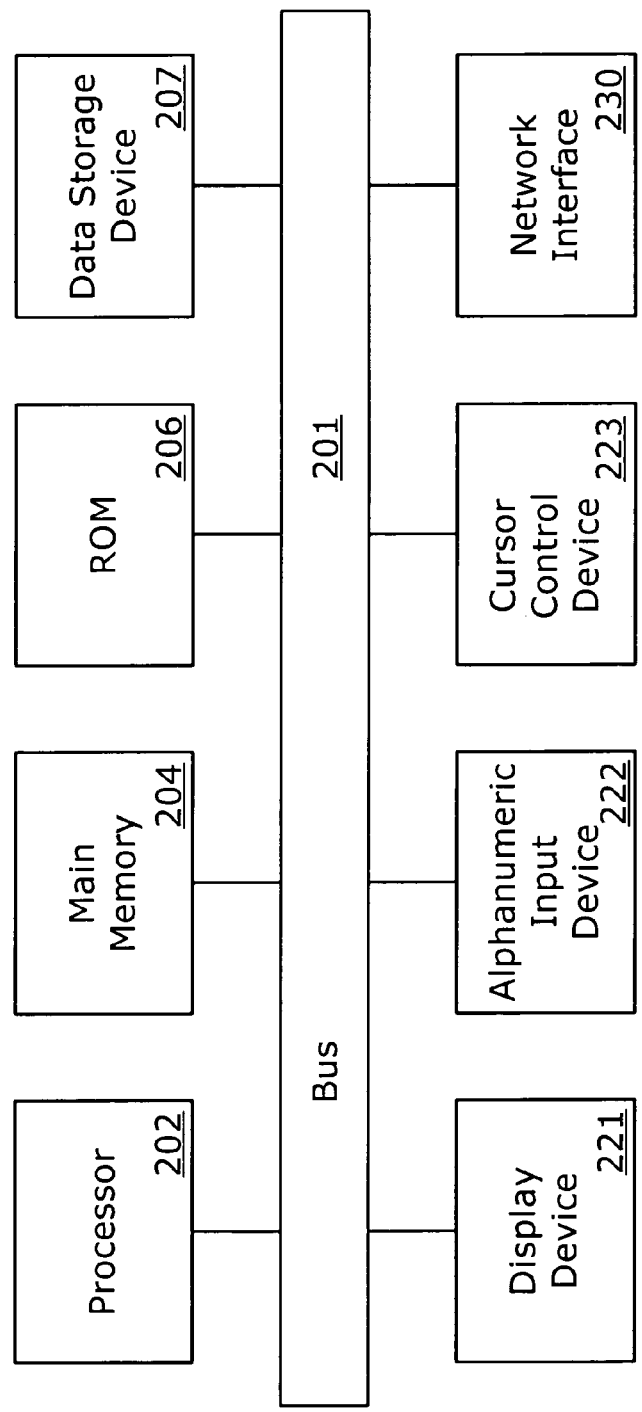
FIG. 2 is one embodiment of a computer system suitable for use with electronic commerce.

FIG. 2 is one embodiment of a computer system suitable for use with the invention. The computer system illustrated in FIG. 2 is intended to represent a range of electronic systems, for example, computer systems. Alternative electronic systems can include more, fewer and/or different components.

Computer system 200 includes bus 201 or other communication device to communicate information, and processor 202 coupled to bus 201 to process information. While computer system 200 is illustrated with a single processor, computer system 200 can include multiple processors and/or co-processors. Computer system 200 further includes random access memory (RAM) or other dynamic storage device 204 (referred to as main memory), coupled to bus 201 to store information and instructions to be executed by processor 202. Main memory 204 also can be used to store temporary variables or other intermediate information during execution of instructions by processor 202.

Computer system 200 also includes read only memory (ROM) and/or other static storage device 206 coupled to bus 201 to store static information and instructions for processor 202. Data storage device 207 is coupled to bus 201 to store information and instructions. Data storage device 207 such as a magnetic disk or optical disc and corresponding drive can be coupled to computer system 200.

Computer system 200 can also be coupled via bus 201 to display device 221, such as a cathode ray tube (CRT) or liquid crystal display (LCD), to display information to a computer user. Alphanumeric input device 222, including alphanumeric and other keys, is typically coupled to bus 201 to communicate information and command selections to processor 202. Another type of user input device is cursor control 223, such as a mouse, a trackball, or cursor direction keys to communicate direction information and command selections to processor 202 and to control cursor movement on display 221.

Network interface 230 provides an interface between computer system 200 and an external network (not shown in FIG. 2). Network interface 230 can be, for example, a network interface card (NIC) or any other type of network interface capable of providing network access to computer system 200.

Instructions are provided to main memory 204 from a storage device, such as magnetic disk, a read-only memory (ROM) integrated circuit (IC), CD-ROM, DVD, via a remote connection (e.g., over a network), etc. In alternative embodiments, hard-wired circuitry can be used in place of or in combination with software instructions to provide on-line prescription ordering.

Figure 3:
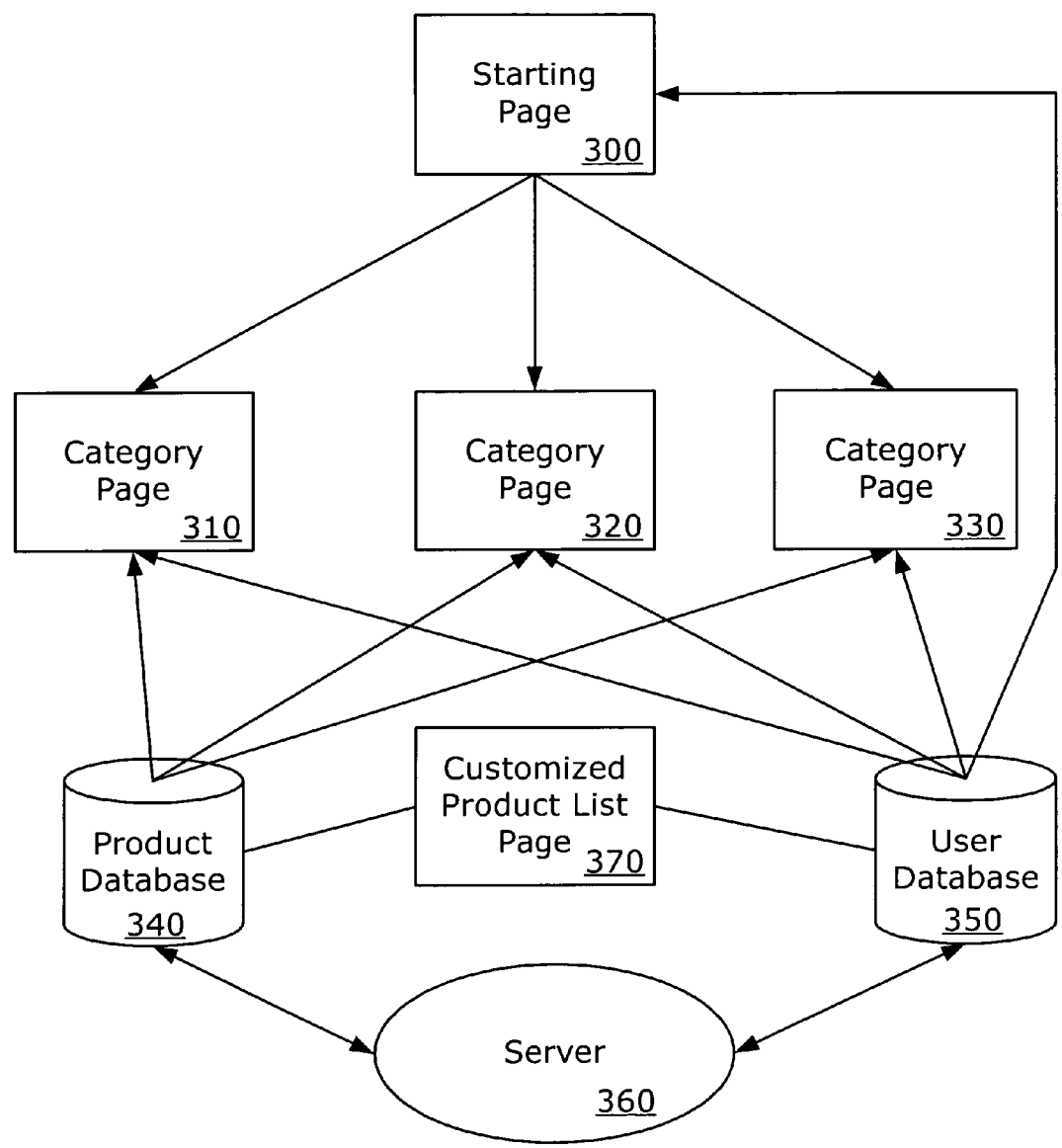
FIG. 3 illustrates one embodiment of a configuration for providing a set of World Wide Web electronic commerce pages.

FIG. 3 illustrates one embodiment of a configuration for providing a set of World Wide Web electronic commerce pages. Starting page 300 provides a starting page for users of an electronic commerce site. Starting page 300 can be different for different users to provide a more customized experience for the user or starting page 300 can be the same for all users. In one embodiment, starting page 300 is a Hypertext Markup Language (HTML) document; however, any appropriate programming language can be used.

Starting page 300 can receive user information from user database 350. In one embodiment, user database 350 stores information (e.g., name, address, preference information, previous order information) related to users of the electronic commerce site. User information can be retrieved from user database 350 based on, for example, using a "cookie" stored on the user's computer system to identify which user to retrieve information for, or alternatively, based on a login procedure.

In general, a cookie is information that a Web server stores on a client device to provide information to the server at a later time. A cookie can, for example, provide identification information, preferences, or similar information to the server when the client device subsequently contacts the server. The cookie can be used to identify a user the corresponding information can be retrieved from user database 350 and used without requiring the user to enter information that had previously been provided.

From starting page 300, a user can navigate to one of several category pages (e.g., 310, 320, 330). In one embodiment, the category pages provide information (e.g., photographs, prices, manufacturer) related to various products offered for sale through the electronic commerce site. In one embodiment, product information is provided in response to user requests by product database 340, which can be implemented in any manner known in the art. Also, although not shown in FIG. 3, product database 340 can also provide information to starting page 300.

Category pages are not required; however, some organization of information that a user can navigate may provide a better experience for the user. Starting page 300 can also provide links to multiple related Web pages, rather than categories. For example, starting page 300 can operate as an electronic commerce "mall" and provide links to more specific electronic commerce sites (e.g., clothing, jewelry, electronics).

In one embodiment, user database 350 maintains a record of products previously purchased by various users as well as other useful information. In one embodiment, one or more products previously purchased are presented to the user in the form of a list. The user can select a product from the list for simplified reordering or for other (e.g., research, pricing) information. The list can be presented in several formats with various categorizations. The following are some, but not all, of the formats and categorizations in which the list of products can be presented.

The list of products can be presented as a pull-down/pop-up menu, as a menu item, as a linked document, or in any other format. When the list of products is presented to the user, the list includes all of the products previously purchased, all of the products previously purchased within a predetermined time period, a predetermined number of products. The products included in the list can be categorized in any manner, selected categories of products can be presented, etc. Any other useful categorization can also be used.

The user can select one or more of the products from the list for reordering. In one embodiment, shipping information (e.g., address, shipping method, payment method) are verified in response to a product being selected and the server causes the product to be ordered and shipped to the user. If the shipping information has changed or is inaccurate, the user can modify the shipping information as needed.

In one embodiment, customized product list page 370 is compiled from product database 340 and user database 350 for each user that accesses starting page 300. Customized product list page 370 includes information related to previous purchases. For example, customized product list page 370 can list all products previously purchased by a particular user, either in a categorized (e.g., by product category, by date, by price) format or an uncategorized format. Customized product list page 370 can also include additional information such as, for example, products the user intends to purchase in the future, or products that the user wishes to research. A customized product listing can also be provided to the user in a different format, for example, the listing can be in the form of a menu or any other format.

Server 360 operates in conjunction with product database 340 and user database 350 to provide starting page 300 and multiple category pages with product information and user information as described above.

Figure 4:
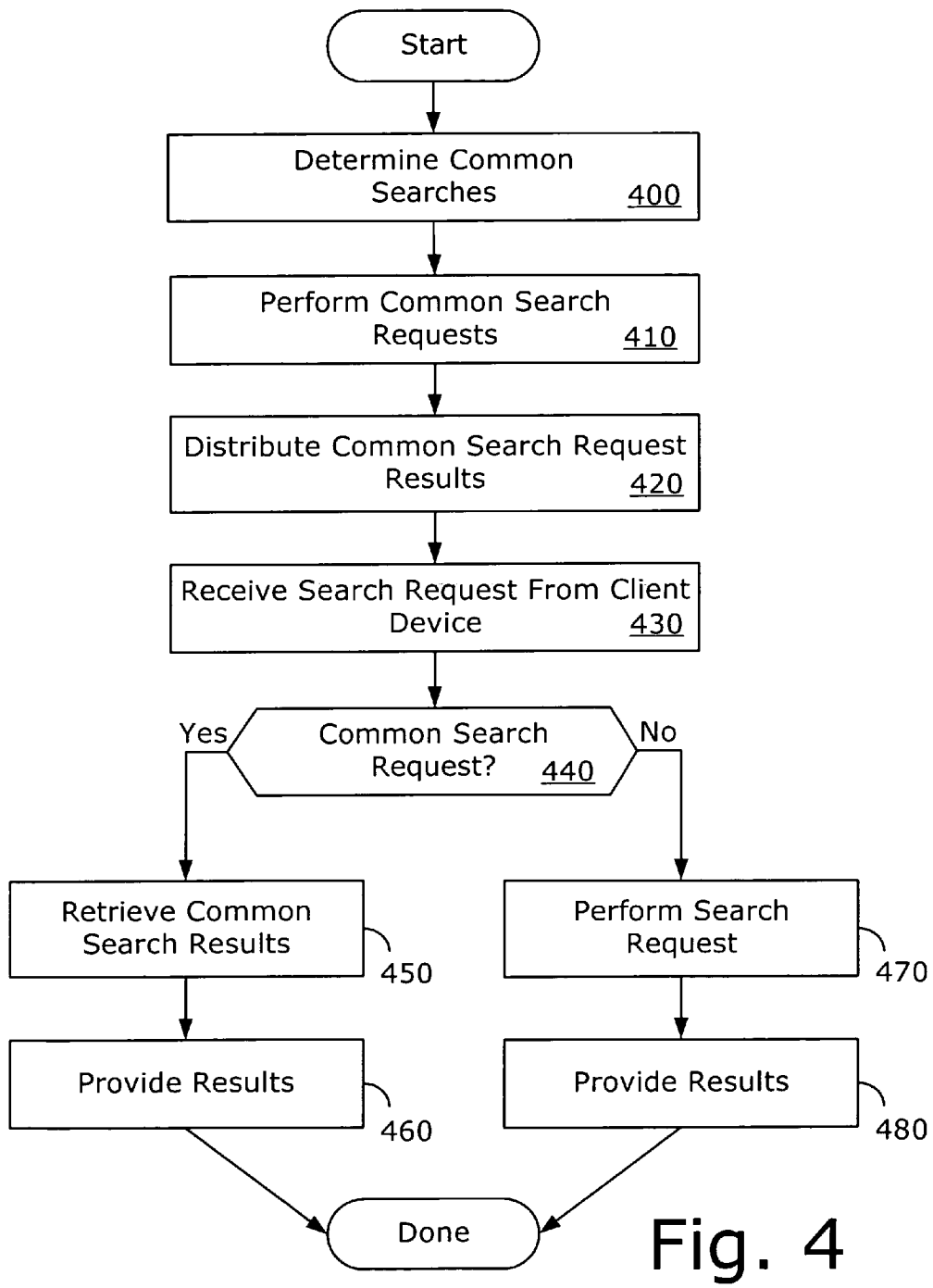
FIG. 4 is a flow chart of one embodiment of providing predetermined search results.

FIG. 4 is a flow chart of one embodiment of providing predetermined search results. Common searches are determined at 400. In one embodiment, previously received search requests are analyzed to determine the frequency of the search requests to determine whether the search request is common. For example, a threshold value can be used to determine whether a search request is common.

Also, searches that are anticipated to be common can be designated as common search requests. For example, during flu season a search for flu remedies can be pre-designated as a common search. Similarly, category searches can be treated as common search requests.

The common search requests are performed on a database of information at 410. In one embodiment, each server of a Web farm stores a copy of a product/service database that is offered by an electronic commerce Web site. The database information is updated periodically. When the database information is updated, the common searches are performed on the updated database. The updated database and the corresponding search results are distributed to the servers of the Web farm at 120.

In response to a server receiving a search request from a client device at 430, the server determines whether the search request is a common search request at 440. If the search request is a common search request at 440, the corresponding search results are retrieved at 450 and provided at 460. If the search request is not a common search request at 440, the server performs the search on the database at 470 and provides the results at 480.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A computer implemented method comprising:

storing product data on a server coupled to receive requests from client devices over a network, the product data representing one or more products offered by the server, wherein the requests from the client devices are received for purchasing at least one of the offered products;

generating a set of one or more common search requests for subsets of the product data based on how often the search requests for requesting the subsets of the product data have been received by the server from the client devices previously, wherein a search request is designated as a common search request if a number of the search requests received at the server from the client devices within a predetermined period of time exceeds a predetermined threshold;

performing searches in one or more databases associated with the server in response to the set of common search requests to identify one or more products;

storing on the server a result of the searches based on the common search requests associated with the identified one or more products;

receiving at the server a subsequent search request from a client device over the network;

the server determining whether the subsequent search request is equivalent to one of the previously performed common search requests whose search results are stored in the server;

providing results from the stored results of the common search requests previously generated in response to the common search requests without performing a search for the subsequent search request, if the subsequent search request is equivalent to one of the common search requests;

performing the search for the subsequent search request if the subsequent search request is not equivalent to one of the previously performed common search requests; and designating the subsequent search request as a common request if a number of the subsequent search request received within the predetermined period of time exceeds the predetermined threshold.

2. The method of claim 1 wherein the product data is stored on one of a plurality of servers, and further wherein and all requests from a particular user during a session are directed to a single server.

3. The method of claim 2 wherein a session comprises all requests that occur between a first request of the session and a predetermined period of time during which no requests are received by the server.

4. The method of claim 3, wherein the product data and information related to the session are maintained in volatile memory of the server.

5. The method of claim 1 wherein the set of one or more common search requests comprises one or more searches for a category of information related to various products including at least one medicine product offered by the server over the network.

6. The method of claim 5 wherein the data stores product information for use with an electronic commerce World Wide Web site, and wherein at least one search request for at least one medicine product is designated as a common search request based on whether the at least one search request for the at least one medicine product is commonly used in a specific season of a year at the time of the at least one request is received at the server.

7. A machine-readable medium having stored thereon sequences of instructions that, when executed by one or more processors, cause one or more electronic devices to:

store product data on a server coupled to receive requests from client devices over a network, the product data representing one or more products offered by the server, wherein the requests from the client devices are received for purchasing at least one of the offered products;

generate a set of one or more common search requests for subsets of the product data based on how often the search requests for requesting the subsets of the product data have been received by the server from the client devices previously, wherein a search request is designated as a common search request if a number of the search requests received at the server from the client devices within a predetermined period of time exceeds a predetermined threshold;

perform searches in one or more databases associated with the server in response to the common search requests to identify one or more products;

store on the server a result of the searches based on the common search requests associated with the identified one or more products;

receive at the server a subsequent search request from a client device over the network;

determine by the server whether the subsequent search request is equivalent to one of the previously performed common search requests;

provide results from the stored results of the common search requests previously generated in response to the common search requests without performing a search for the subsequent search request, if the subsequent search request is equivalent to one of the common search requests;

perform the search for the subsequent search request if the subsequent search request is not equivalent to one of the previously performed common search requests; and designate the subsequent search request as a common request if a number of the subsequent search request received within the predetermined period of time exceeds the predetermined threshold.

8. The machine-readable medium of claim 7 wherein the product data is stored on one of a plurality of servers, and further wherein and all requests from a particular user during a session are directed to the server.

9. The machine-readable medium of claim 8 wherein a session comprises all requests that occur between a first request of the session and a predetermined period of time during which no requests are received by a single server.

10. The machine-readable medium of claim 9, wherein the product data and information related to the session are maintained in volatile memory of the server.

11. The machine-readable medium of claim 7 wherein the set of one or more common search requests comprises one or more searches for a category of information related to various products including at least one medicine product offered by the server over the network.

12. The machine-readable medium of claim 11 wherein the database stores product information for use with an electronic commerce World Wide Web site, and wherein at least one search request for at least one medicine product is designated as a common search request based on whether the at least one search request for the at least one medicine product is commonly used in a specific season of a year at the time of the at least one request is received at the server.

13. Computer data instructions embodied in a computer readable storage medium that, when executed by one or more processors, cause one or more electronic devices to:

store product data on a server coupled to receive requests from client devices over a network, the product data representing one or more products offered by the server, wherein the requests from the client devices are received for purchasing at least one of the offered products;

generate a set of one or more common search requests for subsets of the product data based on how often the search requests for requesting the subsets of the product data have been received by the server from the client devices previously, wherein a search request is designated as a common search request if a number of the search requests received at the server from the client devices within a predetermined period of time exceeds a predetermined threshold perform searches in one or more databases associated with the server in response to the set of common search requests to identify one or more products;

store on the server a result of searches based on the common search requests;

receive at the server a subsequent search request from a client device over the network;

determine by the server whether the subsequent search request is equivalent to one of the previously performed common search requests;

provide results from the stored results of the common search requests previously generated in response to the common search requests without performing a search for the subsequent search request, if the subsequent search request is equivalent to one of the common search requests;

perform the search for the subsequent search request if the subsequent search request is not equivalent to one of the previously performed common search requests; and designate the subsequent search request as a common request if a number of the subsequent search request received within the predetermined period of time exceeds the predetermined threshold.

14. The computer data instructions of claim 13 wherein the product data is stored on one of a plurality of servers, and further wherein and all requests from a particular user during a session are directed to the server.

15. The computer data instructions of claim 14 wherein a session comprises all requests that occur between a first request of the session and a predetermined period of time during which no requests are received by a single server.

16. The computer data instructions of claim 15, wherein the product data and information related to the session are maintained in volatile memory of the server.

17. The computer data instructions of claim 13 wherein the set of one or more common search requests comprises one or more searches for a category of information related to various products including at least one medicine product offered by the server over the network.

18. The computer data instructions of claim 17 wherein the database stores product information for use with an electronic commerce World Wide Web site, and wherein at least one search request for at least one medicine product is designated as a common search request based on whether the at least one search request for the at least one medicine product is commonly used in a specific season of a year at the time of the at least one request is received at the server.

* * * * *